June 11, 1963 D. W. DANIEL 3,092,935
METHOD AND APPARATUS FOR FINISHING GEARS
Filed Sept. 6, 1960
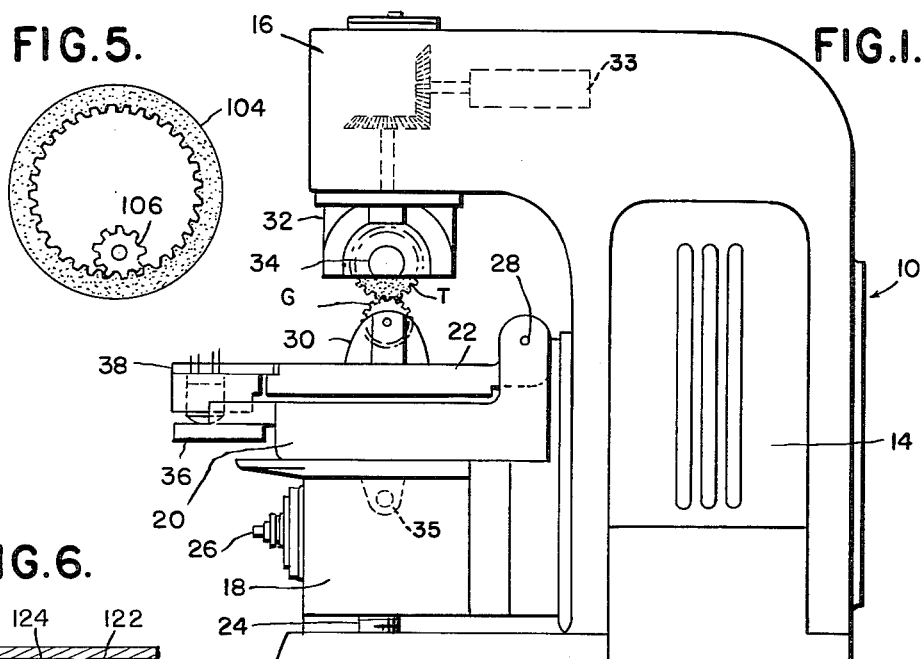
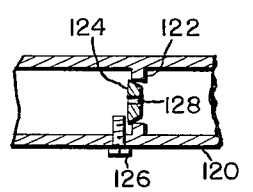
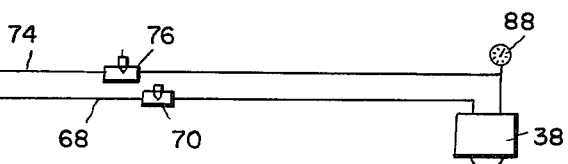
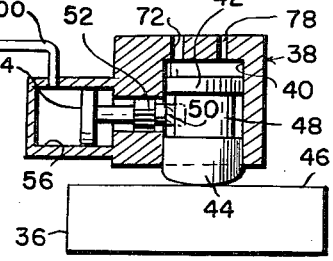
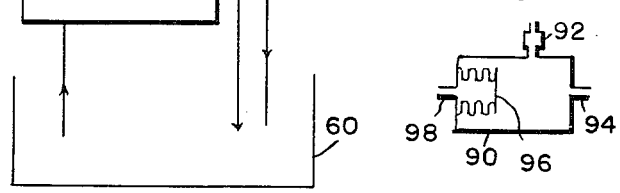
INVENTOR.
DAVID W. DANIEL
BY Whittemore
Hulbert & Belknap
ATTORNEYS

United States Patent Office 3,092,935
Patented June 11, 1963

3,092,935
METHOD AND APPARATUS FOR
FINISHING GEARS
David W. Daniel, Detroit, Mich., assignor to National
Broach & Machine Company, Detroit, Mich., a corporation of Michigan
Filed Sept. 6, 1960, Ser. No. 54,211
18 Claims. (Cl. 51—105)

The present invention relates to a method and apparatus for finishing gears.

The present application is a continuation-in-part of my prior copending application Serial No. 661,727, filed May 27, 1957, now abandoned.

In the past a gear finishing operation known as gear honing has been developed. This operation employs a honing tool in the form of a gear having teeth at least the surface portions of which are formed of a relatively hard, strong, slightly yieldable, and highly resilient plastic material having abrasive particles embedded therein. This tool is run in mesh with a gear to be finished, which gear may be a hardened gear, preferably with the axes of the gear and tool crossed (in the case of cylindrical gears and tools), one of the members being driven in rotation and the other member being driven solely as a result of the meshed engagement between the members.

The operation is quite different from grinding. While the pitch line velocity of the meshed gear and tool members may be relatively high, at least several hundred feet per minute, it will of course be appreciated that the nature of the sliding contact between engaging surfaces on the teeth of the members is quite different, this relative sliding motion being the resultant of involute slide (which reduces to zero at the pitch line) and a crossed axes slide which results from the fact that the gear and tool are rotating in different planes.

According to the present invention the gear and tool may be meshed together in the manner of two external gears or an external and internal gear, in which latter case the honing tool may be either the internally or externally toothed member.

In addition to the foregoing, the herein described method and apparatus may be employed for finishing other types of gears such as bevel, spiral bevel, hypoid, conical involute, and the like.

It is an object of the present invention to provide a method and apparatus for finishing gears in which the gear is run in mesh with a gear-like tool, either the gear or tool being driven directly and the other of the members being driven solely through their meshed engagement, the rotation ordinarily being accompanied by relative traverse, which in the case of cylindrical gears may be parallel to the axis of the gear or in a plane parallel to the axes of both the gear and tool, and in which the gear and tool are maintained in accurately controlled radial pressure contact.

It is a further object of the present invention to provide a method for finishing gears which includes the step of providing a controlled radial pressure therebetween.

It is a further object of the present invention to provide a method as characterized in the preceding paragraph in which the radial pressure between the gear and tool is controlled by varying the pressure of fluid supplied to a variable chamber fluid pressure means.

Other objects and features of the invention will become apparent as the description proceeds, especially when taken in conjunction with the accompanying drawings, illustrating preferred embodiments of the invention, wherein:

FIGURE 1 is a side elevation of the gear finishing machine to which the present invention is applied.

FIGURE 2 is a fluid circuit diagram.

FIGURE 3 is an enlarged diagrammatic sectional view of the pressure applying means.

FIGURE 4 is a diagrammatic showing of the combination of air and hydraulic pressure to the system.

FIGURE 5 is a diagrammatic illustration of the present invention applied to include an internal gear member.

FIGURE 6 is a diagrammatic sectional view illustrating a second embodiment of the present invention.

Referring now to the figures, the gear finishing machine illustrated in FIGURE 1 comprises a frame indicated generally at 10 including a base 12, a column 14, an overhanging portion 16, a vertically movable knee 18, a carriage 20 mounted on the knee, and a pivoted support table 22. The knee 18 is vertically movable to accommodate gears of different size and to provide a preliminary setting of the machine. Suitable means, such for example as a feed screw 24, may be provided for effecting vertical adjustment of the knee, this being accomplished by rotation between the feed screw 24 and a nut (not shown), as controlled by a handle applied to the squared end of an actuating shaft 26. The carriage 20 is mounted on suitable ways provided at the top of the knee 18 and may be mounted thereon for reciprocation in a horizontal plane in a direction perpendicular to the plane of the figure. In other cases, as is well understood in the art, the direction of traverse may be varied.

Mounted on the carriage 20 is the pivoted table 22, the table being mounted for rocking movement about pivot means indicated at 28 which extend horizontally and which are located above the plane of the table so as to be somewhat closer to the horizontal plane passing through the axis of a gear to be finished. Mounted on the pivoted table 22 is rotary work support means including a headstock (not shown) and the tail stock indicated at 30. The work gear is indicated at G.

In the gear honing operation the gear G is in mesh with a tool T. While the axes of the gear G and tool T in FIGURE 1 are indicated as parallel, in practice the axes of these members will be crossed in space, normally at an angle of between three and thirty degrees or higher in some cases. The tool T is carried by an angularly adjustable head 32, the head being mounted for adjustment about a vertical axis to vary the crossed axes setting between the gear and tool. Means including a motor 33 is provided and is connected to the spindle 34 of the tool T to drive the tool in rotation.

Normally, suitable feed means such as the feed screw and nut indicated at 35 are provided for effecting relative traverse between the carriage 20 and the knee 18.

The pivoted table 22 is mounted for substantially free angular movement about the axis of its pivot support 28 and limited angular movement from the position illustrated produces substantially vertical movement of the gear G. When the gear G is in firm mesh with the tool T, additional upward torque applied to the table 22 results in radial pressure or force acting between the gear and tool.

Referring now more particularly to FIGURE 3, means are provided for moving the pivoted table 22 upwardly in a controlled manner. The carriage 20 has rigidly secured thereto a support plate 36. Fixedly secured to the pivoted table 22 is an expansible chamber fluid pressure operated means indicated generally at 38 which comprises a cylinder 40 open at its bottom having a piston 42 vertically movable therein. The lower end of the piston includes a spherically rounded portion 44 engageable with the upper surface 46 of the support plate 36. The intermediate portion of the piston 42 is reduced as indicated at 48 and is engaged by a friction lock 50 carried by a plunger 52 connected to a piston 54 movable horizontally in a cylinder 56.

Referring now to FIGURE 2 there is illustrated the fluid diagram for supplying fluid to the piston and cylinder device. In this figure the fluid for actuating the pivoted table 22 is the coolant employed in the gear finishing operation. A sump is indicated at 60, from which a coolant pump 62 draws coolant and supplies it to a three-way valve 64 through a conduit 66. The three-way valve has suitable means (not shown) to direct fluid through a conduit 68 and adjustable needle valve 70 to the large port 72 in the piston and cylinder device 38. The line 66 is also connected through a line 74 and adjustable needle valve 76 to the small port 78 of the piston and cylinder device. The pressure of fluid supplied to the piston and cylinder device is controlled by a pressure regulating valve 80. A second pressure regulating valve 82 controls the pressure of fluid supplied through the line 84 to the coolant valve 86.

To initiate operation the three-way valve 64 is set to supply fluid to the cylinder 30, a smaller flow extending through the needle valve 76 and the small port 78 leading to the cylinder. The comparatively large flow of fluid is thus effective to swing the pivoted table 22 upwardly as seen in FIGURE 1. The pressure of fluid required to initiate upward movement of the table is readily observed in a pressure gauge 88. When the table has been swung upwardly to a position representing tight mesh between the teeth of the gear and tool, the pressure will increase and the difference in the observed pressure and the pressure effective to move the table upwardly is the pressure which is effective to determine the total force acting radially between the teeth of the gear and tool. At this time, with the members in zero backlash, valve 64 is operated to close line 68 during the honing cycle, so that flow of fluid into and out of cylinder 40 is through valve 76.

It will be appreciated that if an effort were made to determine the instantaneous pressure existing between the teeth of the gear and tool after the parts had been moved into tight mesh by hand rotation of the shaft 26, it would be impossible to estimate this pressure with any degree of accuracy. This is because the mass of material including the knee, carriage and table is so great that variation of one or a few hundred pounds in pressure would not be readily observable. However, when the relatively lighter pivoted table 22 is swung upwardly, the fluid pressure required to move it upwardly with great accuracy and the excess pressure developed when the table is brought to rest indicates the pressure which determines the actual force existing between the gear and cutter. This of course can be readily varied by suitable adjustment of the pressure regulating valve 80.

In carrying out this operation it is desirable for the radially movable one of the gear and tool members to be disposed on a pivoted support, so that gradual radial movement during the operation does not have to overcome static friction of a large amount, as would be inherent in a slide. Thus, undesirable surges and variations in pressure are avoided.

While the present invention illustrates an external gear in mesh with an external tool, it will of course be apparent that either the gear or tool may be in the form of an internal gear and that in the proper case, the pressure developed between the gear and tool may be determined by subtracting the pressure during the machining operation from the pressure required to lift the movable part of the structure. This would be the case for example, when an internal gear was mounted on the pivoted table 22 and in which the tool was in mesh with teeth adjacent the top of the internal gear.

The foregoing is illustrated diagrammatically in FIGURE 5 in which there is shown an internal gear member 104 in meshing relation with an external gear member 106. It will be appreciated that the member 104 may be a work gear or a honing tool, and conversely, the gear member 106 may be a honing tool or a work gear. The members 104 and 106 are of course supported for rotation and one of the members is rotated directly as previously described. If the member 106 is carried for rotation by the table 22 of the honing machine it will of course be apparent that the pressure noted in the gauge 88 must be less when the gear and hone are in mesh than when the gear and hone are out of mesh. In this cause the honing pressure will be determined by the difference in pressure provided by a dual pressure system and may be read by comparing indicated pressures when the gear and hone are in pressure contact and out of pressure contact.

Obviously of course, if the gear member 106 is positioned to engage the internal gear member 104 at the top, then honing pressure will again be determined by the increase in gauge pressure occasioned by engagement between the gear and honing tool.

Inasmuch as fluid is admitted during the finishing operation through the needle valve 76 and through the relatively small port 78, the pivoted table 22 is allowed to move upwardly as material is removed from the teeth of the gear. Satisfactory results have been obtained when the needle valve 76 was set to supply approximately .003 cubic inch of oil a second, and needle valve 70 was set to supply approximately .125 cubic inch per second. The restriction afforded by the small passage 78 and the needle valve 76 tends to stabilize the table since movement thereof tends to force oil through the restricted flow passages and the resistance to flow tends to eliminate rapid movements or vibration of the table. On the other hand, oil is supplied through the restriction 76 sufficiently rapidly to insure that the pivoted table 22 follows up as material is removed from the teeth of the gear.

The gear and honing tool are thus moved into tight mesh with a controlled radial force therebetween. Thereafter, as the honing operation proceeds the honing pressure is maintained only by the fluid passing the highly restrictive needle valve 76. This is set so as to supply sufficient fluid to maintain the honing pressure at a substantially constant value during the gradual approach between the gear and hone as occasioned by removal of material from the gear teeth. However, if eccentricity exists in the gear it will be appreciated that forces are developed tending to move the table 22 rapidly at a rate determined by the speed of rotation of the work gear. Inasmuch as downward movement of the table can be permitted only by expelling fluid past the needle valve 76 and/or the restriction 78, it will be apparent that downward movement of the table is opposed by a much greater force than is normally effective to maintain the gear and hone in pressure contact. As a result of this, greater honing pressure is applied to the high side of the gear with the result that eccentricity is quickly removed. After eccentricity has been removed the honing pressure remains substantially constant during the balance of the cycle.

In some cases it may be undesirable to employ the coolant supplied to the machine tool as the source of fluid under pressure for actuating the pivoted table 22. In this case means suggested by the diagrammatic sketch of FIGURE 4 may be employed. Here a reservoir 90 is supplied with oil through a check valve 92 and the oil is supplied through a passage 94 to the interior of the cylinder 40 through passages corresponding to the passages 72 and 78 provided with adjustable restrictions such as the needle valves 70 and 76. Line 94 may thus correspond to line 66, with provision for supply of fluid through check valve 92. To apply the desired pressure to the fluid expansible means, means such for example as the bellows 96 may be included in the reservoir 90 and the interior of the bellows supplied with air under pressure through the air line 98. The effective pressure of oil may thus be determined by controlling the air pressure.

This system has the advantage of employing compressed air, which is ordinarily available in shops.

It has also been found that the system as described in the foregoing may be operated satisfactorily by the application of air pressure directly to the interior of the cylinder 40. It was anticipated that air pressure applied directly for the purpose of lifting the pivoted table 22 might be objectionable since the air is readily compressible and it was thought that vibration might develop, particularly when attempting to finish an eccentric gear. It was found however, that undesirable vibration of the table 22 did not develop and this is apparently accounted for by the fact that the table 22, while having a mass which is only a fraction of the complete assembly including the carriage 20 and knee 18, nevertheless has a substantial mass which in conjunction with internal friction in the system, prevents quick movement thereof. Accordingly, as an eccentric gear is rotated in mesh with the tool evidently the air pressure is effective to hold the table 22 in a position such that the high portion of the gear contacts the tool until it is cut or abraded away, after which the operation continues uniformly. It is desirable to keep the volume of cylinder 40 above piston 42 at a minimum.

Referring again to FIGURE 3, it may be noted that in some cases after the gear has been brought into pressure contact with the tool with a carefully controlled predetermined force, it may be desirable to set the table and to prevent further vertical movement thereof either upwardly or downwardly during the remainder of the cycle or during a portion of the remainder of the cycle. In this case fluid pressure is applied to the cylinder 56 as through passage 100 and moves the friction lock 50 into contact with the surface of reduced portion 48. The engagement of the surface 48 and the corresponding surface of the friction lock 50 is such as to effectively prevent movement of the piston 42 in either direction.

Pressure admitted to the cylinder 56 which is effective to lock the piston 42 against movement, may if desired be interrupted at the termination of each stroke of traverse as for example by momentary actuation of a three-way valve 102 to exhaust fluid from cylinder 56 so that there can be a slight radial infeed between the gear and hone. Thus, the honing operation during each stoke is maintained at constant center distance between the gear and hone, this center distance having been adjusted by radial movement between the gear and hone at the end of each stroke under a predetermined force.

The actual force effective to maintain pressure contact between the teeth of the gear and hone may be varied widely in accordance with the conditions encountered and the results desired. In geenral, it may be said that this pressure should be maintained at a value of less than 200 pounds total force. As to the minimum value, for very fine finishing operations the radial pressure may be reduced to one or a few pounds. As a matter of fact, some finishing operations may be carried out in backlash, either opposing rotation of the driven member with a brake or depending upon the resistance to rotation inherent in the machine design. The present invention does not include within its scope an operation under backlash conditions and this is mentioned merely to indicate that the lower limit of effective radial pressure approaches zero.

A second embodiment of the invention is illustrated in FIGURE 6. Basically, the change illustrated in this figure resides in the provision of a combined check valve and metering valve or restriction. The arrangement is such that the check valve is moved off its seat so as to permit substantially unrestricted flow of fluid in a direction which causes the table 20 to raise so as to cause approach between the gear and honing tool. However, in the case of an eccentric gear, downward movement of the table as caused by passage of the high point of the gear throuhg the zone of mesh, causes the check valve to close, and flow at this time is through the small orifice in the check valve. By selecting the size of the orifice, the force opposing rapid separation between the gear and hone can be controlled. The result is that increased honing pressure is available during passage of a high point of an eccentric gear gear so that the eccentricity is quickly removed.

Referring specifically to FIGURE 6, there is indicated diagrammatically a fluid passage 120 having a valve seat 122 therein. The valve element is indicated at 124 and is retained against displacement by a screw 126 or the like. The screw is positioned so that the valve can move a very short distance off the valve seat 122. Accordingly, when flow of fluid is from right to left as seen in the figure, the valve element 124 moves off its seat and a substantial flow is permitted. However, when flow is induced from left to right, the valve quickly seats and at this time further flow is through the restricted passage 128.

It will of course be understood that the extreme case is when the restricted passage 128 is of negligible size or is completely omitted. With this arrangement, separation between the hone and gear is positively prevented. This however, is not ordinarily recommended because dangerously high pressures may be developed which would be injurious to the honing tool.

This system differs from that previously described primarily in that there is no restriction of flow in the direction which causes approach between the gear and hone. Thus, in the case of an eccentric gear, the gear and hone will move into tight mesh at the low portion of the gear and increased honing pressure will be available immediately upon initial separation between the gear and hone. In the embodiment of the invention previously described, the restriction to flow will tend to prevent the hone and gear moving into full mesh at the low portion of the gear. The result is that with the form of invention described in conjunction with FIGURE 6, a somewhat more rapid correction of eccentricity is obtained.

The drawings and the foregoing specification constitute a description of the improved method of finishing gears in such full, clear, concise and exact terms as to enable any person skilled in the art to practice the invention, the scope of which is indicated by the appended claims.

What I claim as my invention is:

1. The method of finishing a gear member having teeth which comprises meshing said gear member with a gear-like honing tool member having teeth generally conjugate to the teeth of the gear member with the axes of said members crossed, driving one of said members in rotation at a pitch line velocity sufficient to produce honing of the surfaces of the teeth of the gear member by the teeth of the tool member, and driving the other member solely through the meshed engagement between said members, applying a moving force to one of said members in a direction parallel to the common normal to the axes of both of said members to cause approach between sadi members at a rate only slightly greater than the rate of approach permitted by removal of material from the teeth of said members, and applying an additional force to said other member in a direction opposing separation between said members upon rapid separation between said members as occasioned by eccentricity of said gear member.

2. Gear finishing apparatus comprising a rotary support for a gear member, a rotary support for a gear-like honing member in position to provide for meshing of said members, means for driving one of said members in rotation at pitch line velocity of several hundred feet a minute, a movable structure on which one of said supports is mounted for movement generally toward and away from the other member, means for applying a force to said movable structure urging it in a direction to cause approach between said members, and means for restricting the rate of movement of said movable structure so as to provide for continuous substantially uniform pressure between said members during the slow movement of said movable structure occasioned by removal of stock from said gear member but to apply a substantially greater force opposing relatively rapid movement of said movable structure in a direction away from said other member.

3. Gear finishing apparatus comprising a rotary support for a gear member, a rotary support for a gear-like honing member in position to provide for meshing of said members, means for driving one of said members in rotation at pitch line velocity of several hundred feet a minute, a movable structure on which one of said supports is mounted for movement generally toward and away from the other member, means for applying a substantially constant force to said movable structure in a direction causing it to approach said other member, and means for restricting the rate of movement of said movable structure to a rate sufficient to allow for continuous engagement between said members at substantially uniform pressure as a result of removal of stock from said gear member but insufficient to provide for the relatively rapid movement of said movable structure occasioned by engagement between an eccentric gear member and a gear-like honing member.

4. Gear finishing apparatus comprising a rotary support for a gear member, a rotary support for a gear-like honing member in position to provide for meshing of said members, means for driving one of said members in rotation at pitch line velocity of several hundred feet a minute, a movable structure on which one of said supports is mounted for movement generally toward and away from the other member, fluid operated expansible chamber means connected to said structure to apply a force thereto to provide a controlled force acting radially between meshed members carried by said supports, a source of fluid under pressure, a restricted fluid passage connecting said source to said chamber means, said restricted passage having a restriction therein effective to provide a flow of fluid adequate to cause said movable structure to move at a rate to maintain pressure during removal of material from said members, but to prevent rapid movement thereof due to eccentricity of the gear member.

5. Gear finishing apparatus comprising a rotary support for a gear member, a rotary support for a gear-like honing member in position to provide for meshing of said members, means for driving one of said members in rotation at pitch line velocity of several hundred feet a minute, a movable structure on which one of said supports is mounted for movement generally toward and away from the other member, fluid operated expansible chamber means connected to said structure to apply a force thereto to provide a controlled force acting radially between meshed members carried by said supports, a source of fluid under pressure, a passage connecting said source to said chamber means, and means for regulating the pressure of fluid in said chamber at a predetermined value during relative approach between said members and at a higher value during separation, said last means comprising a restriction limiting the rate of flow of fluid between said source and chamber means.

6. Gear finishing apparatus comprising a rotary support for a gear member, a rotary support for a gear-like honing member in position to provide for meshing of said members, means for driving one of said members in rotation at pitch line velocity of several hundred feet a minute, a movable structure on which one of said supports is mounted for movement generally toward and away from the other member, fluid operated expansible chamber means connected to said structure to apply a force thereto to provide a controlled force acting radially between meshed members carried by said supports, a source of fluid under pressure, a passage connecting said source to said chamber means, means for regulating the pressure of fluid in said chamber at a predetermined value during relative approach between said members and at a higher value during separation, said last means comprising a restriction limiting the rate of flow of fluid between said source and chamber means, and a check valve arranged to bypass said restriction when flow of fluid is toward said chamber means.

7. Gear finishing apparatus comprising a rotary support for a gear member, a rotary support for a gear-like honing member in position to provide for meshing of said members, means for driving one of said supports in rotation at a speed representing a pitch line velocity of the member carried thereby of at least several hundred feet a minute, a movable structure on which one of said members is mounted for movement generally vertically toward and away from the other member, fluid operated expansible chamber means connected to said structure to apply a generally vertical force thereto sufficient to overcome its weight and to provide a controlled average force acting radially between meshed members carried by said supports, said expansible chamber means having connected thereto fluid supply means including a restricted passage for supplying fluid thereto during a gear finishing operation, said restricted passage having a restriction therein effective to provide a flow of fluid adequate to cause said vertically movable structure to move at a rate to maintain pressure during removal of material from said members but to prevent rapid movement thereof due to eccentricity of the gear member, said expansible chamber means comprising a piston and cylinder device, and fluid actuated wedge means for blocking the piston against movement during a gear finishing operation.

8. Gear finishing apparatus comprising a rotary support for a gear member, a rotary support for a gear-like honing member in position to provide for meshing of said members, means for driving one of said supports in rotation at a speed representing a pitch line velocity of the member carried thereby of at least several hundred feet a minute, a movable structure on which one of said members is mounted for movement generally vertically toward and away from the other member, fluid operated expansible chamber means connected to said structure to apply a generally vertical force thereto sufficient to overcome its weight and to provide a controlled average force acting radially between meshed members carried by said supports, said expansible chamber means having connected thereto a restricted passage for supplying fluid thereto during a gear finishing operation, means for supplying hydraulic fluid to said expansible chamber means at a controlled pressure through said restriction, and air pressure operated means for applying pressure directly to the hydraulic fluid.

9. In a gear finishing machine of the character described, means for controlling radial pressure between a meshed gear member and a gear-like honing tool member which comprises a support for one of said members pivoted for swinging in a vertical plane, an expansible chamber fluid pressure operated means connected to said support, a comparatively unrestricted fluid supply passage connected to the chamber of said device to supply fluid under pressure thereto to move the support to mesh said members, a comparatively restricted fluid supply passage to apply fluid under pressure to maintain the total average force acting radially between said members at a controlled average value, and valve means for controlling said passages to apply pressure to the chamber during a gear finishing operation through said restricted passage.

10. Apparatus as defined in claim 9 which comprises means for supplying hydraulic fluid to said passages, and means for regulating the pressure thereof.

11. Apparatus as defined in claim 10 in which said chamber means comprises a piston and cylinder device.

12. Apparatus as defined in claim 11 which comprises selectively operable means to prevent movement of the piston in the cylinder during a gear finishing operation.

13. Apparatus as defined in claim 9 which comprises means for supplying air to said passages, and means for regulating the pressure thereof.

14. Apparatus for honing gears comprising rotary supports for supporting a gear in mesh with a gear-like hone, means for driving one of said supports in rotation, means mounting one of said supports for movement toward and away from said other support, means for applying a regulated and measurable force acting between a gear and hone carried by said supports comprising a fluid motor connected to said one support, supply means for supplying fluid to said motor at a regulated pressure, means for indicating the fluid pressure necessary to move said one support prior to engagement between the gear and hone and the increased fluid pressure after engagement between the gear and hone as an indication of the force acting directly between the gear and hone, and locking means for locking said one support at the center distance from said other support which it reaches under the regulated force applied by said motor, said supply means comprising a hydraulic pump, and a pressure regulating valve connected to said pump.

15. Apparatus as defined in claim 14 in which said motor comprises an expansible chamber and in which said supply means further comprises a restricted passage connected to supply hydraulic fluid to said chamber.

16. Apparatus for honing gears comprising rotary supports for supporting a gear in mesh with a gear-like hone, means for driving one of said supports in rotation, means mounting one of said supports for movement toward and away from said other support, means for applying a regulated and measurable force acting between a gear and hone carried by said supports comprising a fluid motor connected to said one support, supply means for supplying fluid to said motor at a regulated pressure, means for indicating the fluid pressure necessary to move said one support prior to engagement between the gear and hone and the increased fluid pressure after engagement between the gear and hone as an indication of the force acting directly between the gear and hone, means for locking said one support at the center distance from said other support which it reaches under the regulated force applied by said motor, means for reciprocating one of said supports in a plane parallel to the axes of both of said supports, and means for releasing and reapplying said locking means during reciprocation.

17. Gear finishing apparatus comprising a rotary support for a gear member, a rotary support for a gear-like honing member in position to provide for meshing of said members, means for driving one of said members in rotation at a pitch line velocity of several hundred feet a minute, a movable structure on which one of said supports is mounted for movement generally toward and away from the other member throughout a small range of movement, means for applying a substantially constant force to said movable structure throughout said small range of movement urging it in a direction to cause said members to approach each other and to engage, and adjustable means for applying a substantially greater predetermined force to said movable structure anywhere within said range to oppose movement of said structure in the opposite direction.

18. Gear finishing apparatus comprising a rotary support for a gear member, a rotary support for a gear-like honing member in position to provide for meshing of said members, means for driving one of said members in rotation at a pitch line velocity of several hundred feet a minute, a movable structure on which one of said supports is mounted for movement generally toward and away from the other member throughout a range of movement which comprises a substantial movement form loading to working positions and a further limited movement required as a result of removal of material from said gear member, fluid operated expansible chamber means connected to said structure to apply a force thereto to provide a controlled force acting radially between meshed members carried by said supports, a source of fluid under pressure, fluid passage means connecting said source to said chamber means, said passage means including means providing for a relatively unrestricted flow of fluid from said source to said chamber means during movement of said movable structure from loading to working position, said passage means also including flow restricting means for so restricting the flow of fluid from said chamber means to said source as to provide for substantially increased pressure in said chamber means as the result of rapid displacement of fluid from said chamber caused by eccentricity of a gear member, said restricting means having a flow capacity sufficient to provide for substantially unrestricted flow at the rate required to allow movement of said movable structure at the rate occasioned by removal of material from said gear member.

References Cited in the file of this patent

UNITED STATES PATENTS

| 2,627,141 | Fraeg | Feb. 3, 1953 |
| 2,885,830 | Watt | May 12, 1959 |